United States Patent [19]

Ramirez

[11] Patent Number: 4,706,970
[45] Date of Patent: Nov. 17, 1987

[54] FLEXIBLE RING SEAL WITH INSERT IN CIRCUMFERENTIALLY EXTENDING CHANNEL

[75] Inventor: Pedro Ramirez, Denver, Colo.

[73] Assignee: Polydyne Industries, Inc., Denver, Colo.

[21] Appl. No.: 671,319

[22] Filed: Nov. 14, 1984

[51] Int. Cl.[4] .............................................. F16J 15/24
[52] U.S. Cl. .................... 277/205; 277/124; 277/188 R; 277/198; 277/166
[58] Field of Search ........... 277/164, 166, 205, 206 R, 277/124, 206 A, 212 R, 214, 212 C, 212 F, 212 FB, 188 R, 188 A, 165, 227, 234, 228, 229, 167.5, 198; 285/110, 111

[56] References Cited

U.S. PATENT DOCUMENTS

| | | | |
|---|---|---|---|
| 1,757,724 | 5/1930 | Larson | 285/111 X |
| 2,027,653 | 1/1936 | Roye | 285/110 X |
| 2,451,888 | 10/1948 | Thompson | 277/205 X |
| 2,815,973 | 12/1957 | Jackson | 277/188 A |
| 2,934,363 | 4/1960 | Knox | 277/188 A X |
| 3,901,517 | 8/1975 | Heathcott | 277/205 |
| 4,103,909 | 8/1978 | Hoffman et al. | 277/101 |
| 4,281,590 | 8/1981 | Weaver | 277/188 A X |
| 4,285,525 | 8/1981 | Held | 277/188 R X |
| 4,300,776 | 11/1981 | Taubenmann | 277/161 X |
| 4,352,499 | 10/1982 | Foster | 277/124 X |
| 4,592,558 | 6/1986 | Hopkins | 277/205 X |

FOREIGN PATENT DOCUMENTS

| | | | |
|---|---|---|---|
| 576594 | 5/1959 | Canada | 277/188 R |
| 40899 | 10/1887 | Fed. Rep. of Germany | 277/205 |
| 432755 | 8/1926 | Fed. Rep. of Germany | 277/188 R |
| 494971 | 3/1930 | Fed. Rep. of Germany | 277/188 R |
| 871236 | 3/1953 | Fed. Rep. of Germany | 277/206 A |
| 711125 | 6/1931 | France | 277/205 |
| 923196 | 2/1947 | France | 277/167.5 |
| 985295 | 3/1951 | France | 277/205 |
| 1166648 | 6/1958 | France | 277/165 |
| 111346 | of 1917 | United Kingdom | 277/205 |
| 561321 | 5/1944 | United Kingdom | 277/205 |
| 708521 | 5/1954 | United Kingdom | 285/111 |

OTHER PUBLICATIONS

Catalog No. AV983, published by American Variseal Corp. (1983), 24 pages.

Primary Examiner—Robert S. Ward
Attorney, Agent, or Firm—John E. Reilly

[57] ABSTRACT

An insert for use with a sealing device having a flexible ring with a circumferentially extending channel which opens in an axial direction at one end of the ring. The channel is bounded by the ring's sidewalls which have external sealing faces engageable with the moving surfaces to be sealed. The insert is comprised of a seal-reinforcing ring having aa flat annular disk and an annular projection extending at least in one axial direction from the disk. The annular projection substantially corresponds in size and configuration to the cross-sectional size and configuration of the channel and is insertable into the channel. The disk defines radially extending seating surfaces disposed at the one end of the ring when the projection is inserted into the channel and limits the depth of the extension of the projection therein. The insert ring is designed with an axial projection extending in one direction away from the seating portion or disk or in opposite directions away from the disk. In either form, the insert ring may be used in combination with a single sealing device or pair of sealing devices.

10 Claims, 5 Drawing Figures 4,706,970

FLEXIBLE RING SEAL WITH INSERT IN CIRCUMFERENTIALLY EXTENDING CHANNEL

This invention relates to sealing devices; and more particularly relates to improvements in sealing elements of the type embodying a generally channel-shaped resilient wiping element to prevent the flow of fluid between moving and stationary parts of various mechanisms, such as, rods, pistons, internal or external face seals.

BACKGROUND AND FIELD OF THE INVENTION

Numerous applications require the use of special sealing devices which are composed of low coefficient of friction materials but at the same time are capable of effectively sealing against the flow of fluid between relatively moving parts. Representative of such sealing devices is SPECTRASEAL TM, manufactured and sold by Microdot/Polydyne of Denver, Colo. The SPECTRASEAL TM is capable of being used in static, reciprocating and rotary applications and is generally in the form of a flexible ring having a generally channel-shaped cross-sectional configuration into which is inserted a spring to exert a spreading force against the sidewalls of the ring whereby to force the sidewalls into sealing engagement with the confronting surfaces of the parts to be sealed. The sealing device is composed of various blends of polytetrafluoroethylene together with other inert plastics and is used in combination with a metal spring element of stainless steel or other metal alloy or may be employed in combination with a variety of elastomeric O-springs selected for particular applications. The particular blend of materials selected for given applications may be varied, for example, to withstand extremely broad ranges in temperature and pressure. However, it has been found that certain high temperature or pressure conditions exceed the endurance capacity of such sealing devices. In other words, the properties of the sealing material become adversely affected by extremely high pressure and temperature conditions so that, at least temporarily, the material tends to become misshapen and incapable of maintaining the necessary sealing contact with the relatively moving parts.

It has been heretofore proposed to employ rigid springs which nest into the spring cavity of the sealing device and which will operate both to support the seal and to force the sidewalls of the seal outwardly so as to maintain their sealing contact under extremely high pressure and temperature conditions. Another approach has been to employ oval-shaped inserts in bidirectional types of seals of the type which are joined together at their static lips. These and other types of insert devices have not proven to be entirely satisfactory from the standpoint of potential seal spring damage at their contacts with the internal spring members of the existing sealing device as well as extrusion failure along the sealing surfaces.

SUMMARY OF THE INVENTION

It is therefore an object of the present invention to provide for a novel and improved seal insert or reinforcing member of simple and effective construction which is capable of reinforcing a sealing device in such a way as to maintain its characteristics under extremely high temperature and pressure conditions while minimizing the risk of damage to the seal.

It is another object of the present invention to provide a seal insert which is capable of operating in combination with a sealing device to maintain effective sealing between relatively moving parts notwithstanding high temperature and pressure conditions.

A further object of the present invention is to provide for a novel and improved insert for use in combination with a sealing device which will effectively preserve the sealing characteristics of the device under extremes of operating conditions without damaging the seal.

An additional object of the present invention is to provide a novel and improved insert for a seal of the type having a flexible ring of generally channel-shaped cross-sectional configuration which will enable the seal to effectively perform its function of sealing between stationary and rotating, reciprocating or vibrating parts to prevent the passage of fluid therebetween either in the presence or absence of high pressures or temperatures.

In accordance with the present invention, an insert has been devised for use with a sealing device of the type having a flexible ring with a circumferentially extending channel which opens in an axial direction at one end of the ring, the channel being bounded by sidewalls of the ring which have external sealing faces engageable with relatively moving surfaces to be sealed. The insert member comprises a seal-reinforcing ring including a flat annular disk and an annular projection extending at least in one axial direction from the disk, the annular projection substantially corresponding in size and configuration to the cross-sectional size and configuration of the channel and being insertable into the channel. The disk defines radially extending seating surfaces which are disposed at the one end of the ring when the projection is inserted into the channel so as to limit the depth of extension of the projection into the channel. The insert ring is designed so as to be either unidirectional or bidirectional, that is to say, with an axial projection extending in one direction away from the seating portion or disk or in opposite directions away from the disk; and in either form may be used in combination with a single sealing device or pair of sealing devices.

Other objects, advantages and features of the present invention will become more readily appreciated and understood when taken together with the following detailed description in conjunction with the accompanying drawings, in which:

DETAILED DESCRIPTION OF THE PREFERRED EMBODIMENT

Figure 1:
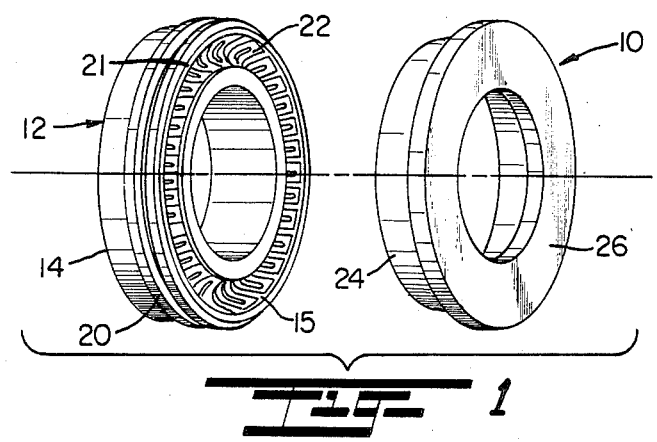
FIG. 1 is an exploded view illustrating the preferred form of invention in combination with a conventional sealing device.

There is shown by way of illustrative example in FIG. 1, the disposition and relationship between a preferred form of insert 10 in accordance with the present invention and a conventional sealing device 12, the sealing device being in the form of a flexible ring having a solid body portion 14 which is of generally rectangular cross-section at one end and provided with a generally U-shaped channel 15 at its opposite end. The channel 15 defines opposed, divergent, circumferentially extending sidewalls 18 and 19 having, respectively, exterior serrated or ribbed sealing faces 20 adjacent to free end surfaces 21. A spring 22 is seated in the channel 15 and extends the full circumferential length of the channel in order to flexibly load the sidewalls 18 and 19 thereby causing their exterior sealing faces 20 to spread into surface engagement with the parts to be sealed, as more clearly illustrated in FIG. 3. Typically, the body 20 of the sealing device 12 is composed of various blends of polytetrafluoroethylene or other inert thermoplastics, and the spring element 22 is composed of stainless steel or other metal alloy, such as, a 301 stainless steel. One such sealing device is SPECTRASEAL TM manufactured and sold by Microdot/Polydyne of Denver, Colo. and which is primarily intended for use as a rod seal, piston seal, internal or external pressure face seal.

Conventional sealing devices of the type described are capable of withstanding temperatures up to 550° F. and pressures on the order of 4500 psi both in static and dynamic seal applications. Beyond such temperature and pressure levels, it has been found that there is a tendency for the devices to lose their sealing properties particularly along the sidewalls as hereinbefore described in more detail.

Accordingly, it is desirable to provide an insert which is capable of maintaining the necessary support for the sealing device without distorting it or causing damage to the internal spring element 22 or promoting extrusion failure along the sealing faces. To this end, the preferred form of insert 10 is broadly comprised of a ring-like projection 24 which tapers forwardly from an annular disk or seating portion 26. As noted from FIGS. 1 and 2 the projection 24, as viewed in cross-section, has inner and outer concentric walls 27 and 28, respectively, which converge or taper toward one another away from a midsection of the seating portion 26 and symmetrically about a center line extending axially through the projection. Each wall 27 and 28 is correspondingly defined by a straight portion 29 which merges into a gently curved portion 30 and terminates in a common rounded end 31. In turn, the disk 26 is in the form of a flat annular plate which is relatively thin with respect to the thickness of the projection 24 and defines radially inwardly and outwardly projecting flanges 33 and 34, respectively, which project equal distances away from the inner and outer walls 27 and 28 of the projection 24 around the entire circumferential extent of the insert 10. The flanges 33 and 34 define flat seating surfaces 35 and 36, respectively, which are adapted to bear against and be coextensive with the end surfaces 21 of the sidewalls 18 and 19 when the projection 24 is inserted into the channel 15 of the sealing device 14. Further, the projection is dimensioned to be slightly smaller than the channel with the sealing device in its relaxed state so that when the assembled sealing device and insert are installed, some limited space or play is afforded to permit deflection or inward squeezing of the walls 18 and 19 of the sealing device into position.

Figure 3:
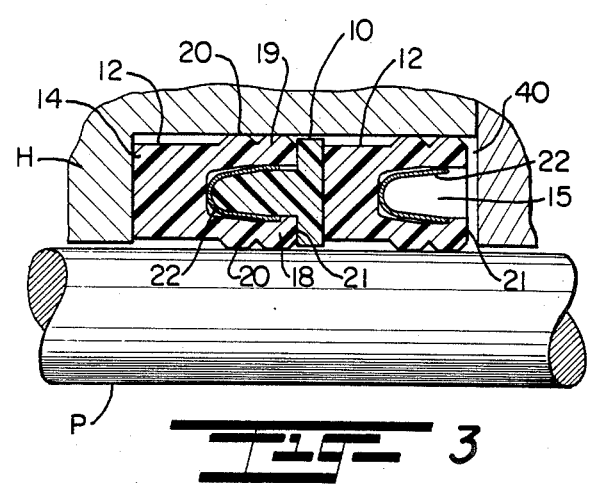
FIG. 3 is a cross-sectional view illustrating the preferred form of insert in assembled relation to a sealing device.

A typical application of the preferred form of insert is illustrated in FIG. 3 wherein a pair of sealing devices 12 are stacked in an annular cavity 40 which is formed in an outer housing represented at H and is disposed in surrounding relation to a piston rod P, the piston rod being operative to undergo reciprocal movement through the housing H. In assembled relation, a pair of the sealing devices 12 are disposed within the housing H such that their channels 15 are facing in the same direction, and the body 14 of one sealing device is separated from the channel 15 of the other sealing device 12 by an insert 10. In other words, the insert 10 is positioned in the channel 15 so that the squared end of the body 14 of the other sealing device rests against the disk or seating portion 26 of the insert, and the seating surfaces 35 and 36 abut the end surfaces 21 at the open end of the channel. Typically, such an arrangement is employed in unidirectional pressure applications in which the first sealing device 12 containing the insert 10 acts as a low temperature seal, and the second sealing device acts as a high temperature seal.

Once installed as illustrated in FIG. 3, the exterior sealing faces 20 of both sealing devices 12, which protrude slightly beyond the radial extent of the seating surface 36, act to sealingly engage the contacting surfaces of the piston rod P and housing H. The projection 24 conforms to the configuration of the spring member 22 but is limited in its axial movement into the channel 15 by the external seating portion 26 so as not to damage the spring elements. The external seating portion 26 together with the projection 24 will maintain the integrity or configuration of the seal when, for the purpose of illustration, is subjected to high temperatures on the order of 600° F. and pressures on the order of 6000 psi. Thus, the low temperature sealing device 12 may be designed to effect optimum sealing in the lower temperature ranges and the high temperature seal will effect sealing in the high temperature ranges while the insert 10 operates more to maintain the configuration of the low temperature seal when exposed to high temperatures.

Figure 4:
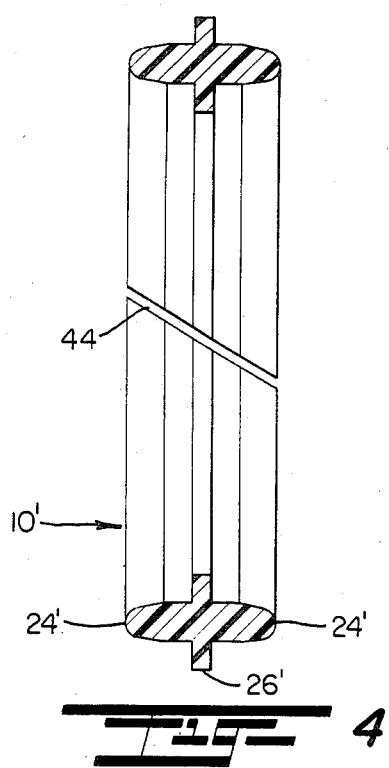
FIG. 4 is a cross-sectional view of a modified form of bi-directional insert in accordance with the present invention.
Figure 2:
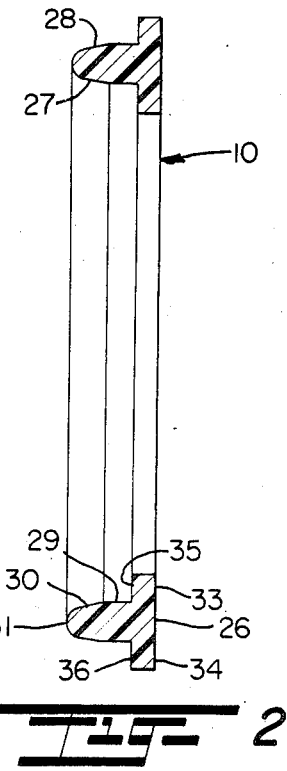
FIG. 2 is a cross-sectional view of the perferred form of uni-directional insert illustrated in FIG. 1.
Figure 5:
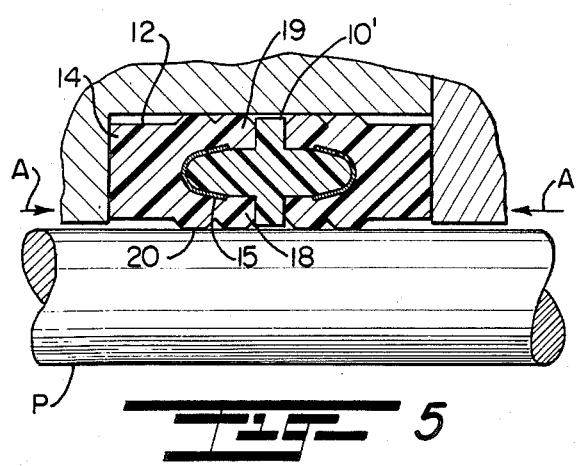
FIG. 5 is a cross-sectional view of the modified form of insert shown in FIG. 4 disposed in assembled relation to a sealing device.

A bidirectional insert 10' is illustrated in FIG. 4 and is constructed in a manner corresponding to that of the unidirectional insert shown in FIG. 2 but has projections 24' directed in opposite directions away from the disk 26'. Preferably, the projections 24' are of corresponding configuration and size and further correspond with the size and configuration of the single projection 24 described with reference to FIG. 2. The modified form of insert is specifically adaptable for use in bidirectional pressure applications where for instance, as shown in FIG. 5, the housing H is subjected to pressure in opposite directions, as designated by the arrows A in FIG. 5. For this purpose, a pair of sealing devices 12 are positioned with their channels 15 in facing relation to one another, and the sealing devices 12 are separated by a common bi-directional insert 10' as illustrated. Again, the axial projections 24' conform to the size and shape of the spring members 22 in each of the sealing devices, and the projections 24' are limited in their axial movement into each channel 15 by the common disk portion 26' which is sandwiched between the end surfaces of the seals 12.

Although not essential to the fabrication of the insert, most desirably the insert is composed of the same material or a material having the same properties as the sealing device 12 in which it is installed. Thus, the insert may be composed of various blends of polytetrafluoroethylene or other inert thermal plastics which may tend to soften or gel somewhat at higher temperature levels but nevertheless will regain or return to their original form at lower temperatures. Typical compositions are a glass fiber-filled polytetrafluoroethylene, poly-amide-imide and ultra high molecular weight polyethylenes.

If desired, the unidirectional or bidirectional insert rings as demonstrated in FIGS. 2 and 4 may be split, for example, as designated at 44 in FIG. 4 or in the alternative may be employed as a solid ring as illustrated in FIGS. 1 and 2.

It is therefore to be understood that various modifications and changes may be made in the construction and arrangement of preferred and modified forms of the present invention as herein set forth and described without departing from the spirit and scope of the present invention as defined by the appended claims.

I claim:

1. In a sealing device of the class described wherein a flexible ring includes a circumferentially extending channel which is generally U-shaped in cross-section and which opens in an axial direction at one end of said ring, said channel bounded by axially extending sidewalls of said ring having external sealing faces engageable with relatively moving surfaces to be sealed, the combination therewith comprising:

a seal-reinforcing insert member including a flat annular disk and an annular projection extending in an axial direction from said disk, said annular projection substanitally corresponding in size and configuration to the cross-sectional size and configuration of said channel and freely insertable into said channel, said disk defining radially extending seating surface means disposed substantially normal to said sidewalls on said one end of said ring when said projection is inserted into said channel whereby to limit the depth of extension of said projection into said channel.

2. In a sealing device according to claim 1, said flexible ring including a spring member disposed in said channel operative to flexibly load said sidewalls in opposite radial directions.

3. In a sealing device according to claim 2, said channel converging in an axial direction away from from said disk, and said spring member corresponding in cross-sectional configuration to that of said channel.

4. In a sealing device according to claim 1, said seating surface means projecting both radially inwardly and outwardly from one end of said annular projection.

5. In a sealing device according to claim 4, said annular projection having opposite sidewalls tapering away from said disk and terminating in a rounded end surface.

6. In a sealing device according to claim 1, wherein a pair of flexible rings are provided in which the channels of each ring are disposed in facing relation to one another, and a common insert member interposed between said flexible rings including a pair of annular projections extending in opposed, axial directions away from said disk and inserted into said channels.

7. In a sealing device according to claim 1, each of said flexible ring and said insert member composed at least in part of a low coefficient of friction polytetrafluoroethylene material.

8. In a sealing device of the class described wherein a flexible ring includes a circumferentially extending channel which opens in an axial direction at one end of said ring, said channel bounded by sidewalls of said ring having external sealing faces engageable with relatively moving surfaces to be sealed and a spring member disposed in said channel operative to flexibly load said sidewalls in opposite radial directions, said channel converging in an axial direction away from said one end surface, and said spring member corresponding in cross-sectional configuration to that of said channel, the improvement comprising:

a seal-supporting insert member composed of the same material as that of said ring including a flat annular disk and an annular projection extending in an axial direction from a flat end surface on said disk, said annular projection substantially corresponding in configuration to the configuration of said channel and being of a size to be freely insertable into said channel, said disk having radially extending surface portions on opposite sides of said annular projection, said surface portions disposed normal to said sidewalls and abutting said one end of said channel when said projection is inserted into said channel.

9. In a sealing device according to claim 8, said surface portions projecting radially inwardly and outwardly from one end of said annular projection, and said annular projection having opposite sidewalls tapering away from said disk and terminating in a rounded end surface.

10. In a sealing device according to claim 9, said disk being of a width less than the width of said flexible ring across said one end surface.

* * * * *